(12) United States Patent
Kakura (10) Patent No.: US 6,636,559 B1
(45) Date of Patent: Oct. 21, 2003

(54) CHANNEL RESPONSE ESTIMATION CIRCUIT

(75) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 609 days.

(21) Appl. No.: 09/583,935

(22) Filed: May 31, 2000

(30) Foreign Application Priority Data

Jun. 2, 1999 (JP) .......................................... 11-154457

(51) Int. Cl.[7] .................................................. H04B 1/69
(52) U.S. Cl. ........................................ 375/150; 375/343
(58) Field of Search ................................ 375/150, 316, 375/324, 341, 343

(56) References Cited

U.S. PATENT DOCUMENTS 5,623,511 A    4/1997  Bar-David et al.
5,912,876 A  * 6/1999  H'mimy ...................... 370/210

* cited by examiner

*Primary Examiner*—Temesghen Ghebretinsae
(74) *Attorney, Agent, or Firm*—Dickstein, Shaprio, Morin & Oshinsky, LLP.

(57) ABSTRACT

A channel response estimation circuit is provided that can estimate a channel longer than a correlation code sequence length. The pattern detection circuit 103 detects a symbol pattern corresponding to an estimated channel length. An inverse matrix for correction corresponding to the detected symbol pattern is input to the correlator-output correction circuit 107. The estimation range selection circuit 105 determines the estimation range. A channel longer than the correlation code sequence length can be estimated by multiplying the correlator-output corresponding to an estimation range selected in the correlator-output correction circuit 107 by the inverse matrix for correction.

18 Claims, 6 Drawing Sheets

CHANNEL RESPONSE ESTIMATION CIRCUIT

BACKGROUND OF THE INVENTION

The present invention relates to a channel response estimation circuit, and more particularly to a channel response estimation circuit that estimates characteristics of communication propagation paths.

Figure 6:
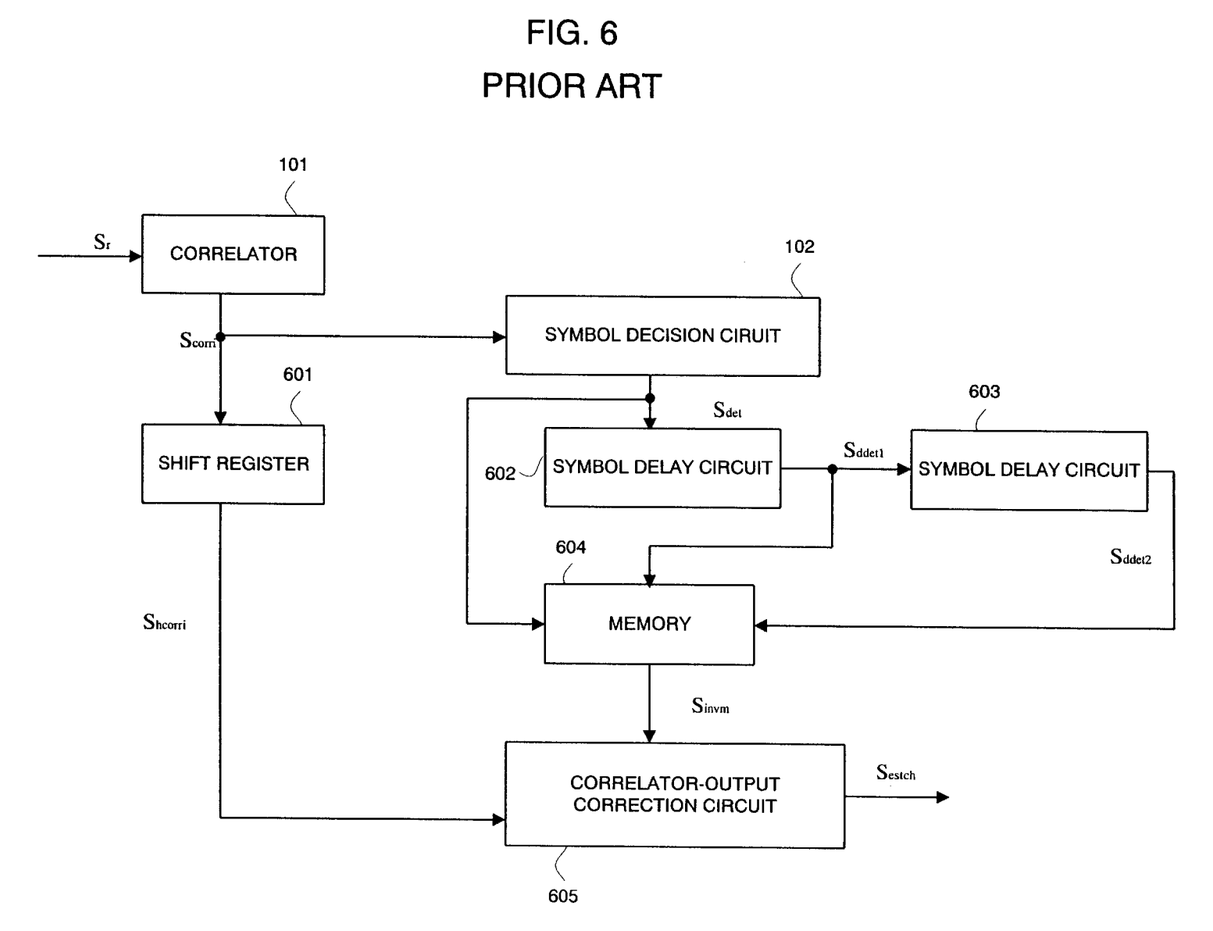
FIG. 6 a block diagram illustrating the configuration of a conventional channel response estimation circuit.

In conventional channel estimation circuits, the length of a channel response to be estimated is limited to less than the length of a correlation code sequence. The channel response estimation circuit, disclosed in U.S. Pat. No. 5,623,511, will be described below by referring to FIG. 6. Referring to FIG. 6, a correlator 101 performs a convolutional operation of a correlation code sequence of an L chip length and a received signal $S_r$ code-spread with the correlation code sequence of an L chip length and then outputs a correlator-output signal $S_{corri}$.

A shift register 601 holds the correlator-output signal Scorri of an L chip length and outputs it as a correlator-output hold signal of an L chip length. A symbol decision circuit 102 receives the correlator-output signal $S_{corri}$ and subjects a symbol of L chips to a code decision and outputs it as a decision signal $S_{det}$. A symbol delay unit 603 delays the decision signal $S_{det}$ by one symbol and outputs it as a delay decision signal $S_{ddet1}$. A symbol delay unit 603 delays the delay decision signal $S_{ddet1}$ by one symbol and then outputs it as a delay decision signal $S_{ddet2}$.

A memory 604 outputs an inverse decision signal $S_{invm}$ corresponding to an inverse matrix which corresponds to a combination of a decision signal $S_{det}$, a delay decision signal $S_{ddet1}$, and a delay decision signal $S_{ddet2}$. A correlator-output correction circuit 605 multiplies the correlator-output hold signal $S_{hcorri}$ of an L chip length by the inverse matrix signal $S_{invm}$ to obtain a channel response of an L chip length and then outputs it as an estimation channel signal $S_{estch}$. Thus, the channel response is estimated.

However, there is the problem that the conventional channel estimation circuit cannot estimate a channel longer than an L chip length.

SUMMARY OF THE INVENTION

The present invention is made to solve the above-mentioned problems.

Moreover, the objective of the invention is to provide a channel response estimation circuit that can estimate a channel longer than a correlation code sequence length L.

The objective of the present invention is achieved by a channel response estimation circuit, comprising a correlator for performing a convolutional operation of a received signal and a correlation code sequence to output a correlator-output signal, the received signal partially having a combination in which the correlation code sequence of an L chip length (where L is a given.natural number) and another correlation code.sequence obtained by inverting signs of the correlation code sequence are strung; a symbol decision circuit for performing a symbol decision of the correlator-output signal to output a decision signal; a pattern detection circuit for receiving the decision signal and then outputting a latch signal in response to detection of a symbol pattern of (2M+1) symbol length (where M is a given-natural number and one symbol corresponds to an L chip) in which a correlation value matrix has an inverse matrix and is used for channel response estimation; a shift register for receiving the correlator-output signal and the latch signal, holding the correlator-output signal of W chip length (where W is a natural number and is expressed as W≧(L+x), where x is 0 or natural number, and x≦L×(M−1)) when the latch signal is input, and outputting a correlator-output hold signal; an estimation range selection circuit for receiving said correlator-output hold signal and selecting a channel response range of an estimated (L+x) chip length and outputting an estimation range selection signal corresponding to the selection range; a memory for outputting an inverse matrix signal corresponding to an inverse matrix of a correlation value matrix corresponding to a symbol pattern used for channel response estimation; and a correlator-output correction circuit for receiving the correlator-output hold signal and the estimation range selection signal and obtaining a channel response of a (L+x) chip length by multiplying the inverse matrix signal by the correlator-output hold signal over a range selected by the estimation range selection signal, and thus outputting an estimation channel signal.

According to the second aspect of the present invention, a channel response estimation circuit comprises a correlator for performing a convolutional operation of a received signal and a correlation code sequence to output a correlator-output signal, the received signal partially having a combination in which the correlation code sequence of an L chip length (where L is a given natural number) and another correlation code sequence obtained by inverting signs of the correlation code sequence are strung; a symbol decision circuit for performing a symbol decision of the correlator-output signal to output a decision signal; a pattern detection circuit for receiving the decision signal and then outputting a latch signal and an inverse matrix selection signal corresponding to a symbol pattern in response to detection of one of plural symbol patterns of (2M+1) symbol length (where M is a given natural number and one symbol corresponds to an L chip) in which a correlation value matrix has an inverse matrix and is used for channel response estimation; a shift register for receiving said correlator-output signal and the latch signal, holding said correlator-output signal of W chip length (where W is a natural number and is expressed as W≧(L+x), where x is 0 or natural number, and x≦L×(M−1)) when the latch signal is input, and outputting a correlator-output hold signal; an estimation range selection circuit for receiving the correlator-output hold signal and selecting a channel response range of an estimated (L+x) chip length and outputting an estimation range selection signal corresponding to the selection range; a memory for receiving the inverse matrix selection signal and outputting an inverse matrix signal corresponding to an inverse matrix of a corresponding correlation value matrix; and a correlator-output correction circuit for receiving the correlator-output hold signal and the estimation range selection signal-and obtaining a channel response of a (L+x) chip length by multiplying the inverse matrix signal by the correlator-output hold signal over a range selected by the estimation range selection signal, and thus outputting an estimation channel signal.

According to the third aspect of the present invention, a channel response estimation circuit comprises a correlator for performing a convolutional operation of a received signal and a correlation code sequence to output a correlator-output signal, the received signal partially having a combination in which the correlation code sequence of an L chip length (where L is a given natural number) and another correlation code sequence obtained by inverting signs of the correlation code sequence are strung; a symbol decision circuit for performing a symbol decision of the correlator-output signal to output a decision signal; a pattern detection circuit for receiving the decision signal and then outputting a latch signal and a polarity selection signal in response to detection of one of two symbol patterns of (2M+1) symbol length (where M is a given natural number and one symbol corresponds to an L chip) in which a correlation-value matrix has an inverse matrix and is used for channel response estimation, the two symbol patterns having a sign opposite to each other; a shift register for receiving the correlator-output signal and the latch signal, holding the correlator-output signal of W chip length (where W is a natural number and is expressed as W≧(L+x), where x is 0 or natural number, and x≦L×(M−1)) when the latch signal is input; and outputting a correlator-output hold signal; an estimation range selection circuit for receiving the correlator-output hold signal and selecting a channel response range of an estimated (L+x) chip length and outputting an estimation range selection signal corresponding to the selection range; a memory for outputting an inverse matrix tentative signal corresponding to an inverse matrix of a correlation value matrix corresponding to a symbol pattern used for channel response estimation; a polarity selection circuit for receiving the polarity selection signal and the inverse matrix tentative signal and outputting an inverse matrix signal, obtained by inverting the sign of the inverse matrix tentative signal or the inverse matrix tentative signal, in response to the polarity selection signal; and a correlator-output correction circuit for receiving the correlator-output hold signal and the estimation range selection signal and obtaining a channel response of a (L+x) chip length by multiplying the inverse matrix signal by the correlator-output hold signal over a range selected by the estimation range selection signal and outputting an estimation channel signal.

According to the fourth aspect of.the present invention, a channel response estimation circuit comprises a correlator for performing a convolutional operation of a received signal and a correlation code sequence to output a correlator-output signal, the received signal partially having a combination in which the correlation code sequence of an L chip length (where L is a given natural number) and another correlation code sequence obtained by inverting signs of the correlation code sequence are strung; a symbol decision circuit for performing a symbol decision of said correlator-output signal to output a decision signal; a pattern detection circuit for receiving the decision signal and then outputting a latch signal and a polarity selection signal in response to detection of one of two symbol patterns of (2M+1) symbol length (where M is a given natural number and one symbol corresponds to an L chip) in which a correlation value matrix has an inverse matrix and is used for channel response estimation, the two symbol patterns having a sign opposite to each other; a shift register for receiving the correlator-output signal and the latch signal, holding the correlator-output signal of W chip length (where W is a natural number and is expressed as W≧(L+x), where x is 0 or natural number, and x≦L×(M−1)) when the latch signal is input, and outputting a correlator-output hold signal; an estimation range selection circuit for receiving the correlator-output hold signal and selecting a channel response range of an estimated (L+x) chip length and outputting an estimation range selection signal corresponding to the selection range; a memory for outputting an inverse matrix signal corresponding to an inverse matrix of a correlation value matrix corresponding to a symbol pattern used for channel response estimation; a correlator-output correction circuit for receiving the correlator-output hold signal and-the estimation range selection signal and obtaining a.tentative channel response of a (L+x) chip length by multiplying the inverse matrix signal by the correlator-output hold signal over a range selected by the estimation range selection signal, and thus outputting an estimation channel tentative signal; and a polarity selection circuit for receiving the estimation channel tentative signal and the polarity selection signal and outputting as an estimation channel signal a signal obtained by inverting the sign of the estimation channel tentative signal or the estimation channel tentative signal, in response to the.polarity selection signal.

According to the fifth aspect of the present invention, a channel response estimation circuit comprises a correlator for performing a convolutional operation of a received signal and a correlation code sequence to output a correlator-output signal, the received signal partially having a combination in which the correlation code sequence of an L chip length (where L is a given natural number) and another correlation code sequence obtained by inverting signs of the correlation code sequence are strung; a symbol decision circuit for performing a symbol decision of the correlator-output signal to output a decision signal; a pattern detection circuit for receiving the decision signal and then outputting a latch signal and a polarity selection signal and an inverse matrix selection signal corresponding to a symbol pattern when one of plural symbol patterns of (2M+1) symbol length (where M is a given natural number and one symbol corresponds to an L chip) is detected, in which a correlation value matrix has an inverse matrix and is used for channel response estimation; a shift register for receiving the correlator-output signal and the latch signal, holding the correlator-output signal of W chip length (where W is a natural number and is expressed as W≧(L+x), where x is 0 or natural number, and x≦L×(M−1)) when the latch signal is input, and outputting a correlator-output hold signal; an estimation range selection circuit for receiving the correlator-output hold signal and selecting a channel response.range of an estimated (L+x) chip length, and outputting an estimation range selection signal corresponding to the selection range; a memory for receiving the inverse matrix selection signal and outputting an inverse matrix tentative signal corresponding to an inverse matrix of a corresponding correlation value matrix; a polarity selection circuit for receiving the polarity selection signal and the inverse matrix tentative signal and outputting.as an inverse matrix signal a signal obtained by inverting the sign of the inverse matrix tentative signal or the inverse matrix tentative signal, in response to the polarity selection signal; and a correlator-output correction circuit for receiving the correlator-output hold signal and the estimation range selection signal and obtaining a channel response of a (L+x) chip length by multiplying the inverse matrix signal by the correlator-output hold signal over a range selected by the estimation range selection signal, and-outputting an estimation channel signal.

According to the sixth aspect of the present invention, a channel response estimation circuit comprises a correlator for performing a convolutional operation of a received signal and a correlation code sequence to output a correlator-output signal, the received signal partially having a combination in which the correlation code sequence of an L chip length (where L is a given natural number) and another correlation code sequence obtained by inverting signs of the correlation code sequence are strung; a symbol decision circuit for performing a symbol decision of the correlator-output signal to output a decision signal; a pattern detection circuit for receiving the decision signal and then outputting a latch signal and a polarity selection signal and a an inverse matrix selection signal corresponding to a symbol pattern, in response to one of plural symbol patterns of (2M+1) symbol length (where M is a given natural number and one symbol corresponds to an L chip), in which a correlation value matrix has an inverse matrix and is used for channel response estimation; a shift register for receiving the correlator-output signal and the latch signal, holding the correlator-output signal of W chip length (where W is a natural number and is expressed as W≧(L+x), where x is 0 or natural number, and x≦L×(M−1)) when the latch signal is input, and outputting a correlator-output hold signal; an estimation range selection circuit for receiving the correlator-output hold signal and selecting a channel response range of an estimated (L+x) chip length, and outputting an estimation range selection signal corresponding to the selection range; a memory for receiving the inverse matrix selection signal and outputting an inverse matrix signal corresponding to an inverse matrix of a corresponding correlation value matrix; a correlator-output correction circuit for receiving said correlator-output hold signal and the estimation range selection signal and obtaining a tentative channel response of a (L+x) chip length by multiplying the inverse matrix signal by the correlator-output hold signal over-a range selected by the estimation range selection signal, and outputting an estimation channel tentative signal; and a polarity selection circuit for receiving the estimation channel tentative signal and the polarity selection signal and outputting as an estimation channel signal a signal obtained by inverting the sign of the estimation channel tentative signal or the estimation channel tentative signal, in response to the polarity selection signal.

According to the present invention with above-mentioned configuration, the pattern detection circuit detects a symbol pattern corresponding to the channel length to be estimated and the estimation range.selection circuit selects the range of a channel response to be estimated. Thus, a channel longer than the length L of a correlation code sequence can be estimated.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

A channel response estimation circuit of the present invention will be described below in detail with reference to the attached drawings.

Figure 1:
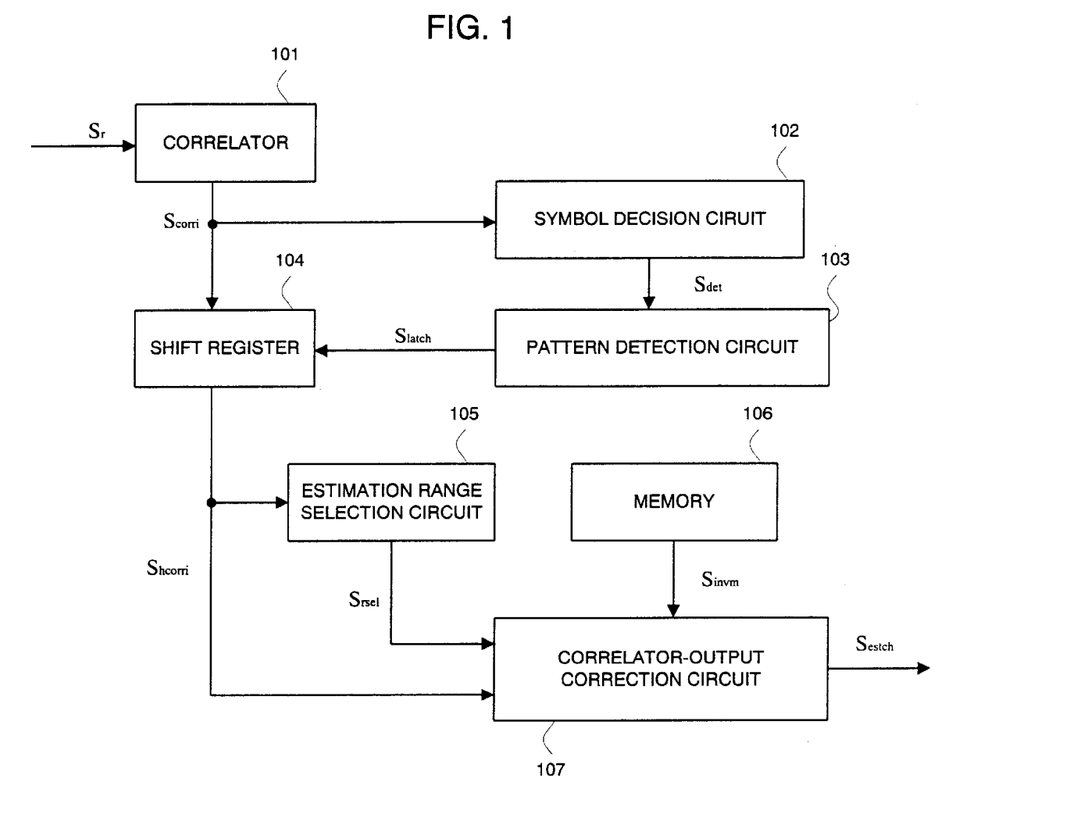
FIG. 1 is a block diagram schematically illustrating the configuration of a channel response estimation circuit according to a first embodiment of the present invention.

FIG. 1 is a block diagram schematically illustrating the configuration of a channel response estimation circuit according to a first embodiment of the present invention. Constituent elements equivalent to as those shown in FIG. 6 are represented with like numerals. Referring to FIG. 1, a correlator 101 performs a convolutional operation of a received signal $S_r$ and a correlation code sequence $S_{code}$ of an L chip length (where L is a given natural number) and outputs the result as a correlator-output signal $S_{corri}$. The received signal has partially a combination in which a correlation code sequence $S_{code}$ and data obtained by code inverting the correlation code sequence $S_{code}$ are strung. A symbol decision circuit 102 performs symbol decision of the correlator-output signal and outputs a decision signal Sdet .

A pattern detection circuit 103 receives a decision signal $S_{det}$. When it detects a symbol pattern of a (2M+1) symbol length (where M is a given natural number and one symbol corresponds to an L chip), which has an inverse correlation value matrix and is used for channel response estimation, the pattern detection circuit 103 outputs a latch signal $S_{latch}$. A shift register 104 holds the correlator-output signal $S_{corri}$ of a W chip length (where W is a natural number and is expressed as W≧(L+x), where x is 0 or natural number, and x≦L×(M−1)) in response to the latch signal $S_{latch}$, and outputs it as a correlator-output hold signal $S_{hcorri}$.

An estimation range selection circuit 105 selects a channel response range of (L+x) chip length to be estimated, in response to the correlator-output hold signal $S_{hcorri}$, and outputs an estimation range selection signal $S_{rsel}$ corresponding to the selection range. A memory 106 outputs an inverse matrix signal $S_{invm}$ which corresponds to an inverse matrix of a correlation value matrix corresponding to a symbol pattern used for channel response estimation. A correlator-output correction circuit 107 multiplies the correlator-output hold signal $S_{hcorri}$ over a range selected with the estimation range selection signal $S_{rsel}$ by the inverse matrix signal $S_{invm}$ and outputs the resultant channel response of (L+x) chip length as the estimation channel signal $S_{estch}$.

Figure 4:
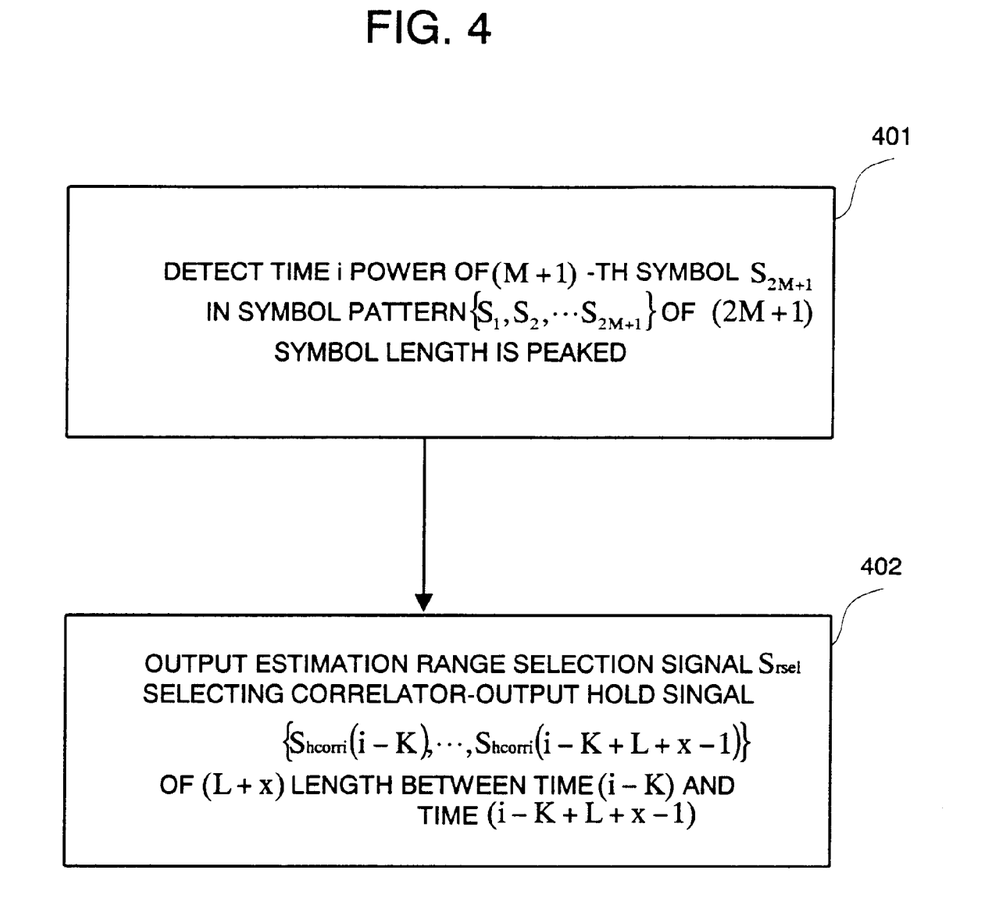
FIG. 4 is a first flow chart of an estimation-range selection procedure.

An example of a flowchart for estimation range decision of the estimation range selection circuit 105 is shown in FIG. 4. First, the time i at which the power of the (M+1)-th symbol $S_{2M-1}$ in the symbol pattern $(S_1, S_2, \ldots, S_{2M+1})$ of (2M+1) symbol length detected by the pattern detection circuit 103 is peaked is detected (step 401). An estimation range selection signal $S_{resl}$ is output to select the correlator-output hold signal $(S_{hcorri}(i-K), \ldots, S_{hcorri}(i-K+L+x-1))$ of (L+x) chip length between the time (i−K) and the time (i−K+L+x−1) (step 402). Thus, an estimation range is determined.

Let us now consider that the case (L=11 and x=11) where a channel response of 22 chip length (one symbol length=11 chips) is estimated in the communication system where 11-bit Barker code {1, −1, 1, 1, −1, 1, 1, 1, −1, −1, −1} is used as a correlation code sequence $S_{code}$. It is assumed that W=27 and K=2. If the symbol pattern detected by the pattern detection circuit 103 is $\{S_1, S_2, S_3, S_4, S_5\}$, the correlation value matrix β of 22×22 is expressed by the following formula.

(1)

$$\beta = \begin{bmatrix} 11S_3 & -S_2 & -S_3 & \cdots & -S_3 & 11S_2 & -S_1 & -S_2 & \cdots & -S_2 \\ -S_4 & 11S_3 & -S_2 & \cdots & -S_2 & -S_3 & -11S_2 & -S_1 & \cdots & -S_1 \\ -S_3 & -S_4 & 11S_3 & \cdots & -S_3 & -S_2 & -S_3 & 11S_2 & \cdots & -S_2 \\ \vdots & \vdots & \vdots & \ddots & \vdots & \vdots & \vdots & \vdots & \ddots & \vdots \\ -S_3 & -S_4 & -S_3 & \cdots & 11S_3 & -S_2 & -S_3 & -S_2 & \cdots & 11S_2 \\ 11S_4 & -S_3 & -S_4 & \cdots & -S_4 & 11S_3 & -S_2 & -S_3 & \cdots & -S_3 \\ -S_5 & 11S_4 & -S_3 & \cdots & -S_3 & -S_4 & 11S_4 & -S_2 & \cdots & -S_2 \\ -S_4 & -S_5 & 11S_4 & \cdots & -S_4 & -S_3 & -S_4 & 11S_3 & \cdots & -S_3 \\ \vdots & \vdots & \vdots & \ddots & \vdots & \vdots & \vdots & \vdots & \ddots & \vdots \\ -S_4 & -S_5 & -S_4 & \cdots & 11S_4 & -S_3 & -S_4 & -S_3 & \cdots & 11S_3 \end{bmatrix}$$

The relationship between an estimation channel signal $S_{estch}$ and a signal $S_{hcsel}$ being the correlator-output hold signal $S_{hcorri}$ over a range selected with the estimation range selection signal $S_{rsel}$ is $S_{hcsel} = \beta S_{estch}$. Accordingly, if an inverse matrix of the correlation value matrix $\beta$ exists, the correlator output hold signal $S_{hcsel}$ over the range selected with the estimation range selection signal Sresl can be converted into the estimation channel signal Sestch, according to the formula, $S_{estch} = \beta^{-1} S_{hcsel}$.

One of symbol patterns where an inverse matrix exists is $\{-1, -1, 1, 1, -1\}$. It is now assumed that inverse matrix data of a correlation value matrix corresponding to the symbol pattern is stored in the memory 106. When the pattern detection circuit 103 detects the symbol pattern $\{-1, -1, 1, 1, -1\}$ it outputs the latch signal $S_{latch}$. The shift register 104 outputs the correlator-output hold signal $S_{hcorri}$ of 27 chip length corresponding to the symbol pattern $\{-1, -1, -1\}$, in response to the latch signal $S_{latch}$. If the channel response is $\{1, 0.9, 0.8, 0.7, 0.8, 0.6, 0.7, 0.8, 0.7, 0.7, 0.6, 0.5, 0.4, 0.5, 0.4, 0.5, 0.4, 0.3, 0.2, 0.1, 0, 0\}$, the correlator output hold signal $S_{hcorri}$ of 22 chip length becomes $\{-5.2, -7.2, -4.0, -4.8, -3.0, 8.4, 7.2, 3.4, 2.2, 1.2, -1.6, 0.4, 1.2, 0.8, 0.8, -0.6, 9.2, 8.8, 7.8, 7.0, 8.4, 6.4, 5.2, 7.2, 4.0, 4.8, 3.0\}$.

The estimation range selection circuit 105 first detects the time i the power of the third symbol in the symbol pattern $\{-1, -1, 1, 1, -1\}$ is peaked. Since the time i corresponds to the peak value of the first 11 bits of the correlator output hold signal $S_{hcorri}$, i=6. The estimation range selection signal $S_{rsel}$ is output to select the correlator output hold signal of 22 chip length $\{S_{hcorrie}(4), \ldots, S_{hcorri}(25)\} = \{-4, 8, \ldots, 0.1\}$ between the time (i–K) and the time (i–K+21).

The memory 106 outputs as an inverse matrix signal $S_{invm}$ the inverse matrix data of the following correlation value matrix.

(2)

$$\beta = \begin{bmatrix} 11 & 1 & -1 & \cdots & -1 & -11 & 1 & 1 & \cdots & 1 \\ -1 & 11 & 1 & \cdots & 1 & -1 & -11 & 1 & \cdots & 1 \\ -1 & -1 & 11 & \cdots & -1 & 1 & -1 & -11 & \cdots & 1 \\ \vdots & \vdots & \vdots & \ddots & \vdots & \vdots & \vdots & \vdots & \ddots & \vdots \\ -1 & -1 & -1 & \cdots & 11 & 1 & -1 & 1 & \cdots & -11 \\ 11 & -1 & -1 & \cdots & -1 & 11 & 1 & -1 & \cdots & -1 \\ 1 & 11 & -1 & \cdots & -1 & -1 & 11 & -1 & \cdots & -1 \\ -1 & 1 & 11 & \cdots & -1 & -1 & -1 & 11 & \cdots & -1 \\ \vdots & \vdots & \vdots & \ddots & \vdots & \vdots & \vdots & \vdots & \ddots & \vdots \\ -1 & 1 & -1 & \cdots & 11 & -1 & -1 & -1 & \cdots & 11 \end{bmatrix}$$

In the correlator-output correction circuit 107, since $S_{estch} = S_{invm} S_{hcsel}$, the estimation channel signal $S_{estch} = \{0, 0, 1, 0.9, 0.8, 0.7, 0.8, 0.6, 0.7, 0.8, 0.7, 0.7, 0.6, 0.5, 0.4, 0.5, 0.4, 0.5, 0.4, 0.3, 0.2, 0.1\}$. In this example, the length for 20 chips of the length for 22 chips can be accurately obtained.

Figure 2:
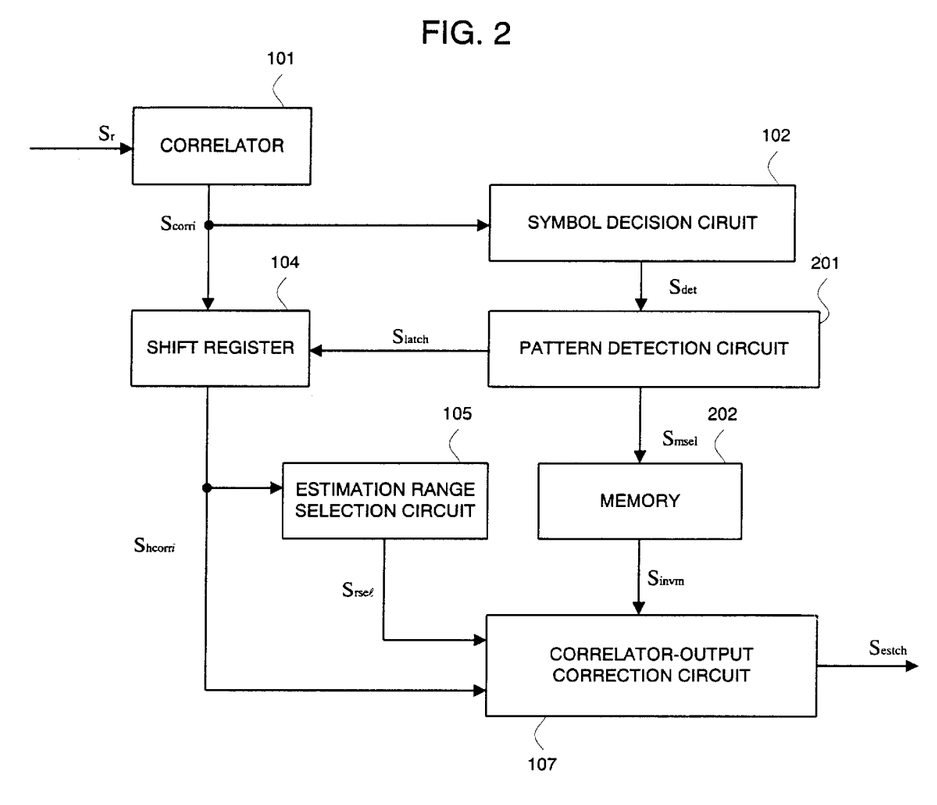
FIG. 2 is a block diagram schematically illustrating the configuration of a channel response estimation circuit according to a second embodiment of the present invention.

FIG. 2 is a block diagram illustrating a channel response estimation circuit according to a second embodiment of the present invention. Constituent elements equivalent to those in FIG. 1 are represented with like numerals. Referring to FIG. 2, the correlator 101 performs a convolutional operation of the received signal Sr and the correlator code sequence $S_{code}$ and outputs the correlator output signal $S_{corri}$. The received signal $S_r$ has partially a combination in which the correlator code sequence $S_{code}$ of an L chip length (where L is a given natural number) and data obtained by inverting the correlator code sequence $S_{code}$ are strung. The symbol decision circuit 102 subjects the correlator-output signal to a symbol decision operation and then outputs a decision signal $S_{det}$.

A pattern detection circuit 201 receives the decision signal $S_{det}$ and detects a symbol pattern of (2M+1) symbol length (where M is a given natural number and one symbol corresponds to an L chip), which has an inverse correlation value matrix and are used for channel response estimation. Thus, the pattern detection circuit 201 outputs a latch signal $S_{latch}$ and an inverse matrix selection signal $S_{msel}$ corresponding to a symbol pattern. A shift register 104 holds the correlator-output signal $S_{corri}$ of W chip length (where+W is a natural number and is expressed as W≧(L+x), where x is 0 or a natural number, and x≦L×(M−1), in response to the latch signal $S_{latch}$ and then outputs the correlator-output hold signal $S_{hcorri}$.

An estimation range selection circuit 105 selects a channel response range of (L+x) chip length to be estimated, in response to the correlator-output hold signal $S_{hcorri}$, and then outputs the estimation range selection signal $S_{rel}$ corresponding to the selection range. The memory 202 receives the inverse matrix selection signal $S_{msel}$ and then outputs an inverse matrix signal $S_{invm}$ corresponding to an inverse matrix of a corresponding correlation value matrix. A corrilator-output correction circuit 107 multiplies the correlator-output hold signal $S_{hcorri}$ for a range selected with the estimation range selection signal $S_{rsel}$ by the inverse matrix signal $S_{invm}$ to obtain a channel response of (L+x) chip length and then outputs the estimation channel signal $S_{estch}$.

Figure 5:
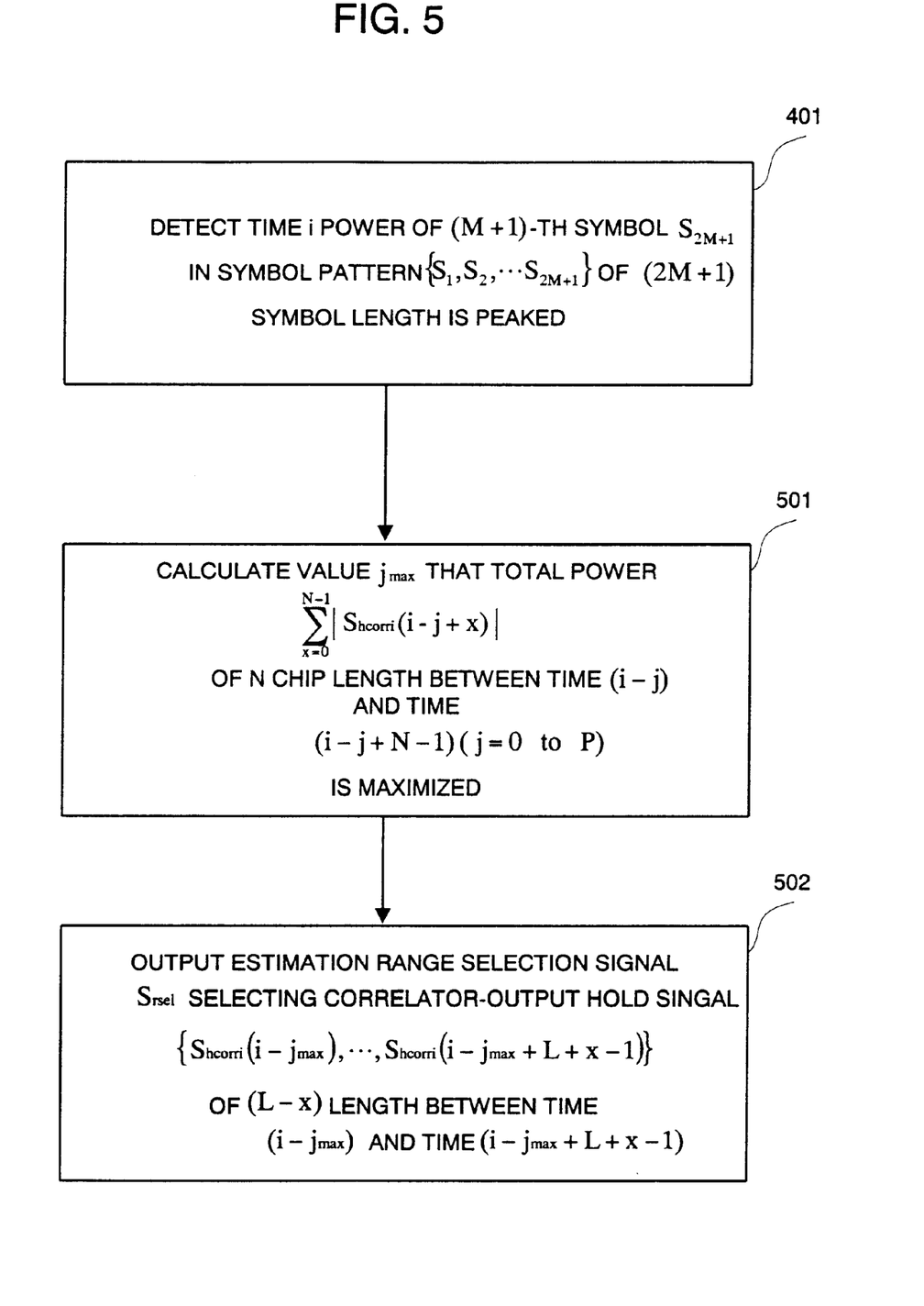
FIG. 5 is a second flow chart of an estimation-range selection procedure.

An example of a flow chart for estimation range decision in the estimation range selection circuit 105 is shown in FIG. 5. Steps equivalent to those in FIG. 4 are represented with like numerals. First, the time i the power of the (M+1)-th symbol S2M+1 in a symbol pattern $\{S_1, S_2, \ldots, S_{2M-1}\}$ of (2M+1) symbol length is peaked is detected (step 401). The symbol pattern is detected by the pattern detection circuit 103 is detected. Next, the value jmax, where the total power of N chip length between the time i and the time (i−j+N−1) (where j=0 to P) is maximized, is obtained according to the following formula (step 501).

$$\sum_{x=0}^{N-1} |S_{hcorri}(i-j+x)| \tag{3}$$

The estimation range selection signal $S_{rsel}$ is output to select the correlator-output hold signal $\{S_{hcorri}(i-jmax), \ldots, S_{hcorri}(i-jmax+L+x-1)\}$ of (L+x) chip length for the period between the time (i−jmax) and the time (i−jmax+L+x−1) (step 502). Thus, the estimation-range is determined. In the communication system where 11-bit Barker code $\{1, -1, 1, 1, -1, 1, 1, 1, -1, -1, -1\}$ is used as the correlation code sequence, like the embodiment 1, let us now assume the case (L=11 and x=11) where the channel response of 22 channel length is estimated. It is now assumed that N=3 and P=3.

Moreover, it is assumed that two sets of inverse data of two correlation matrixes respectively corresponding to symbol patterns {−1, −1, 1, 1, −1} and {1, −1, −1, 1, 1} are stored in the memory 106.

When detecting the symbol pattern {−1, −1, 1, 1, −1} or {1, −1, −1, 1, 1}, the pattern detection circuit 201 outputs the latch signal $S_{latch}$ and the inverse matrix selection signal $S_{msel}$ representing {−1, −1, 1, 1, −1} or {1, −1, −1, 1, 1}. The shift register 104 outputs the correlator-output hold signal $S_{hcorri}$ of 27 chip length corresponding to the symbol pattern {−1, −1, 1, 1, −1} or {1, −1, −1, 1, 1}, in response to the latch signal $S_{latch}$.

When the channel response is {1, 0.9, 0.8, 0.7, 0.8, 0.6, 0.7, 0.8, 0.7, 0.7, 0.6, 0.5, 0.4, 0.5, 0.4, 0.5, 0.4, 0.3, 0.2, 0.2, 0.1, 0, 0} and a symbol pattern to be detected is {−1, −1, 1, 1, −1}, the correlator-output hold signal $S_{hcorri}$ becomes {−5.2, −7.2, −4.0, −4.8, −3.0, 8.4, 7.2, 3.4, 2.2, 1.2, −1.6, 0.4, 1.2, 0.8, 0.8, −0.6, 9.2, 8.8, 7.8, 7.0, 8.4, 6.4, 5.2, 7.2, 4.0, 4.8, 3.0}.

First, the estimation range selection circuit 105 detects the time i the power of the third symbol in the symbol pattern {−1, −1, 1, 1, −1} is peaked. Since the time i corresponds to the peak in the first 11 bits of the correlator-output hold signal $S_{hcorri}$, i=6. Next, the value jmax is obtained at which the total power sum(j) of three chip length for the period the time (i−j) and the time (i−j+N−1) (j=0 to 3) is maximized.

$$sum(j) = \sum_{x=0}^{2} |S_{hcorri}(i - j + x)| \quad (4)$$

Since the following expressions are held, jmax=0.

$sum(0)=|S_{hcorri}(6)|+|S_{hcorri}(7)|+|S_{hcorri}(8)|=19.0$ $sum(1)=|S_{hcorri}(5)|+|S_{hcorri}(6)|+|S_{hcorri}(7)|=18.6$ $sum(2)=|S_{hcorri}(4)|+|S_{hcorri}(5)|+|S_{hcorri}(6)|=16.2$ $sum(3)=|S_{hcorri}(3)|+|S_{hcorri}(4)|+|S_{hcorri}(5)|=11.8$ The estimation range selection signal $S_{rsel}$ is output to select the correlator-output hold signal {$S_{hcorri}$(6), . . . , $S_{hcorri}$(27)}={8.4, . . . , 0} of (L+x) chip length between the time (i−jmax) and the time (i−jmax+L+x−1). The memory 106 selects inverse matrix data of a correlation value matrix of the symbol pattern {−1, −1, 1, 1, −1} corresponding to the inverse matrix selection signal $S_{msel}$ and then outputs an inverse matrix signal $S_{invm}$.

Since the equation holds for $S_{estch}=S_{invm}S_{hcsel}$ in the estimator-output correction circuit 107, the estimation channel signal $S_{estch}$ becomes $S_{estch}$={1, 0.9, 0.8, 0.7, 0.8, 0.6, 0.7, 0.8, 0.7, 0.7, 0.6, 0.5, 0.4, 0.5, 0.4, 0.5, 0.4, 0.3, 0.2, 0.1, 0, 0}. In this example, the 22 chip length can be obtained accurately.

Figure 3:
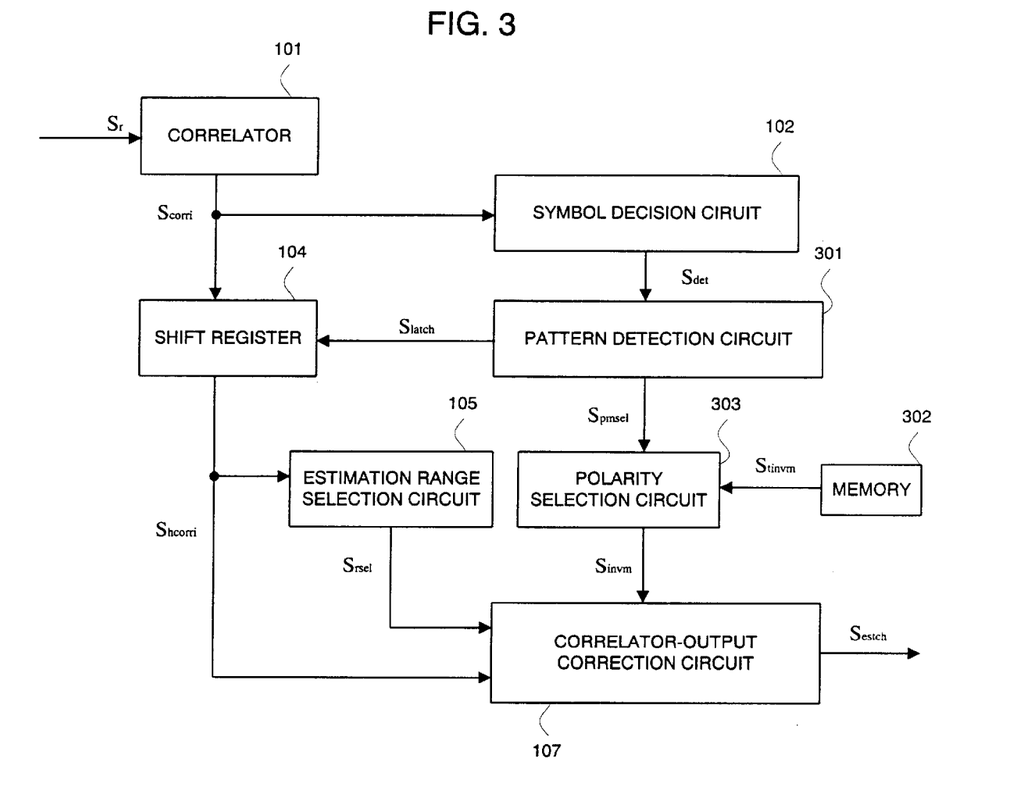
FIG. 3 is a block diagram schematically illustrating the configuration of a channel response estimation circuit according to a third embodiment of the present invention.

FIG. 3 is a block diagram illustrating a channel response estimation circuit according to the third, embodiment. Constituent elements equivalent to those in FIGS. 1 and 2 are represented with like numerals. Referring to FIG. 3, the correlator 101 performs a convolutional operation of the received signal $S_r$ and the correlator-code sequence $S_{code}$ and outputs the correlator-output signal $S_{corri}$. The received signal $S_r$ has partially a combination in which the correlation code sequence $S_{code}$ of an L chip length (where L is a given natural number) and data obtained by inverting the correlation code sequence $S_{code}$ are strung. The symbol decision circuit 102 subjects the correlator output signal to a symbol decision operation and then outputs a decision signal $S_{det}$.

When detecting one of two symbol patterns of (2M+1) symbol length (where M is a given natural number and one symbol corresponds to an L chip), in response to the decision signal $S_{det}$, a pattern detection circuit 301 outputs a latch signal $S_{latch}$ and an polarity selection signal $S_{pmsel}$. The above two symbol patterns have a sign inverted to each other and have an inverse correlation value matrix and are used for channel response estimation. A shift register 104 holds the correlator-output signal $S_{corri}$ of W chip length (where W is a natural number and is expressed as W≧(L+x), where x is 0 or a natural number, and x≦L×(M−1), in response to the latch signal $S_{latch}$ and then outputs the correlator-output hold signal $S_{hcorri}$. An estimation range selection circuit 105 selects a channel response range of estimated (L+x) chip length, in response to the corrilator-output hold signal $S_{hcorri}$, and outputs the estimation range selection signal $S_{res}$1 corresponding to the selection range.

The memory 302 outputs an inverse matrix tentative signal $S_{invm}$ corresponding to an inverse matrix of a corresponding correlation value matrix corresponding to a symbol pattern used for channel response estimation. A polarity selection circuit 303 receives the polarity selection signal $S_{pmsel}$ and the inverse matrix tentative signal $S_{tinvm}$ and then outputs the inverse matrix tentative signal $S_{invm}$ or the inverse matrix signal $S_{invm}$ obtained by the inverse matrix tentative signal $S_{tinvm}$, according to the polarity selection signal $S_{pmsel}$. A corrilator-output correction circuit 107 multiplies the correlator-output hold signal $S_{hcorri}$ for a range selected with the estimation range selection signal $S_{resl}$ by the inverse matrix signal $S_{invm}$ to obtain a channel response of (L+x) chip length and then outputs the estimation channel signal $S_{estch}$.

An example of a flow chart for estimation range decision in the estimation range selection circuit 105 is shown in FIG. 5. First, the time i the power of the (M+1)-th symbol S2M+1 in a symbol pattern {$S_1, S_2, \ldots, S_{2M+1}$} of (2M+1) symbol length. The above symbol pattern is detected by the pattern detection circuit 103. Next, the value jmax, where the total power of N chip length between the time (i−j) and the time (i−j+N−1) (where j=0 to P) is maximized, is obtained according to the equation.

$$\sum_{x=0}^{N-1} |S_{hcorri}(i - j + x)| \quad (5)$$

The estimation range selection signal $S_{rsel}$ is output to select the correlator-output hold signal {$S_{hcorri}$(i−jmax), . . . , $S_{hcorri}$(i−jmax+L+x−1)} of (L+x) chip length between the time (i−jmax) and the time (i−jmax+L+x−1). Thus, the estimation range is determined.

In the communication system where a 11-bit Barker code {1, −1, 1, 1, −1, 1, 1, 1, −1, −1, −1}, for example, is used as the correlation code sequence, like the embodiment 1, let us now assume the case (L=11 and x=11) where the channel response of 22 channel length (one channel length=11 chips) is estimated. It is now assumed that N=3 and P=3. Moreover, it is assumed that the memory 106 stores inverse matrix data of two correlation matrixes respectively corresponding to the symbol pattern {−1, −1, 1, 1, −1}.

When detecting the symbol pattern {−1, −1, 1, 1, −1} or the inverted pattern {1, 1, −1, −1, 1} thereof, the pattern detection circuit 301 outputs the latch signal $S_{latch}$. When the symbol pattern {−1, −1, 1, −1} is detected, the pattern detection circuit 301 outputs the polarity selection signal $S_{pmsel}$ representing positive. When the symbol pattern {1, −1, −1, 1, 1} is detected, the symbol pattern detection circuit 301 outputs the polarity selection signal $S_{pmsel}$ representing negative. The shift register 104 outputs the correlator-output hold signal $S_{hcorri}$ of 27 chip length corresponding to the symbol pattern {−1, −1, 1, 1, −1} in response to the latch signal $S_{latch}$.

When the channel response is {1, 0.9, 0.8, 0.7, 0.8, 0.6, 0.7, 0.8, 0.7, 0.7, 0.6, 0.5, 0.4, 0.5, 0.4, 0.5, 0.4, 0.3, 0.2, 0.1, 0, 0} and the symbol pattern to be detected is {1, 1, −1, −1, 1}, the correlator-output hold signal $S_{hcorri}$ becomes {5.2, 7.2, 4.0, 4.8, 3.0, −8.4, −7.2, −3.4, −2.2, −1.2, 1.6, −0.4, −1.2, −0.8, −0.8, 0.6, −9.2, −8.8, −7.8, −7.0, −8.4, −6.4, −5.2, −7.2, −4.0, −4.8, −3.0}.

First, the estimation range selection circuit 105 detects the time i the power of the third symbol in the symbol pattern {1, 1, −1, −1, 1}. Since the time i corresponds to the peak in the first 11 bits of the correlator-output hold signal $S_{hcorri}$, i=6. Next, the value jmax, at which the total power sum(j) of three chip length between the time (i−j) and the time (i−j+N−1) (j=0 to 3), is maximized is obtained according to the following equation.

$$sum(j) = \sum_{x=0}^{2} |S_{hcorri}(i - j + x)| \qquad (6)$$

Since the following expressions hold, jmax=0.

$sum(0)=|S_{hcorri}(6)|+|S_{hcorri}(7)|+|S_{hcorri}(8)|=19.0$ $sum(1)=|S_{hcorri}(5)|+|S_{hcorri}(6)|+|S_{hcorri}(7)|=18.6$ $sum(2)=|S_{hcorri}(4)|+|S_{hcorri}(5)|+|S_{hcorri}(6)|=16.2$ $sum(3)=|S_{hcorri}(3)|+|S_{hcorri}(4)|+|S_{hcorri}(5)|=11.8$ The estimation range selection signal $S_{rsel}$ is output to select, the correlator output hold signal {$S_{hcorri}(6), \ldots , S_{hcorri}(27)$}={8.4, . . . , 0} of (L+x) chip length between the time (i−jmax) and the time (i−jmax+L+x−1). The memory 302 outputs as the inverse matrix tentative signal $S_{tinvm}$ inverse matrix data of a correlation value matrix of the symbol pattern {−1, −1, 1, 1, −1} The detected symbol pattern of {1, 1, −1, −1, 1} represents that the polarity selection signal $S_{pmsel}$ is negative. Hence, the polarity selection circuit 303 outputs the inverse matrix signal $S_{invm}$ obtained by inverting the inverse matrix tentative signal $S_{tinvm}$.

In the correlator-output correction circuit 107, since $S_{estch}=S_{invm}S_{hcsel}$, the estimation channel signal $S_{estch}$ becomes $S_{estch}$={1, 0.9, 0.8, 0.7, 0.8, 0.6, 0.7, 0.8, 0.7, 0.7, 0.6, 0.5, 0.4, 0.5, 0.4, 0.5, 0.4, 0.3, 0.2, 0.1, 0, 0}. In this embodiment, the entire 22 chip length can be obtained accurately.

As described above, the present invention has the advantage of being capable of estimating a channel longer than the length L of a correlation code sequence.

The entire disclosure of Japanese Application No. 11-154457 filed Jun. 2, 1999 including specification, claims, drawing and summary are incorporated herein by reference in its entirely.

What is claimed is:

1. A channel response estimation circuit, comprising:
   a correlator for performing a convolutional operation of a received signal and a correlation code sequence to output a correlator-output signal, said received signal partially having a combination in which said correlation code sequence of an L chip length (where L is a given natural number) and another correlation code sequence obtained by inverting signs of said correlation code sequence are strung;
   a symbol decision circuit for performing a symbol decision of said correlator-output signal to output a decision signal;
   a pattern detection circuit for receiving said decision signal and then outputting a latch signal in response to detection of a symbol pattern of (2M+1) symbol length (where M is a given natural number and one symbol corresponds to an L chip) in which a correlation value matrix has an inverse matrix and is used for channel response estimation;
   a shift register for receiving said correlator-output signal and said latch signal, holding said correlator-output signal of W chip length (where W is a natural number and is expressed as W≧(L+x), where x is 0 or natural number, and x≦L×(M−1)) when said latch signal is input, and outputting a correlator-output hold signal;
   an estimation range selection circuit for receiving said correlator-output hold signal and selecting a channel response range of an estimated (L+x) chip length and outputting an estimation range selection signal corresponding to said selection range;
   a memory for outputting an inverse matrix signal corresponding to an inverse matrix of a correlation value matrix corresponding to a symbol pattern used for channel response estimation; and
   a correlator-output correction circuit for receiving said correlator-output hold signal and said estimation range selection signal and obtaining a channel response of a (L+x) chip length by multiplying said inverse matrix signal by said correlator-output hold signal over a range selected by said estimation range selection signal, and thus outputting an estimation channel signal.

2. The channel response estimation circuit defined in claim 1, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−K) and time (i−K+L+x−1) (where K is 0 or natural number and K≦i).

3. The channel response estimation circuit defined in claim 1, wherein said-estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−j) and time (i−j+L+x−1), j corresponding to a value where the total power of N-chip length (N≦L−1) between time (i−j) and time (i−j+N−1) (where i is 0 to P (natural number)) is maximized.

4. A channel response estimation circuit, comprising:
   a correlator for performing a convolutional operation of a received signal and a correlation code sequence to output a correlator-output signal, said received signal partially having a combination in which said correlation code sequence of an L chip length (where L is a given natural number) and another correlation code sequence obtained by inverting signs of said correlation code sequence are strung;
   a symbol decision circuit for performing a symbol decision of said correlator-output signal to output a decision signal;
   a pattern detection circuit for receiving said decision signal and then outputting a latch signal and an inverse matrix selection signal corresponding to a symbol pattern in response to detection of one of plural symbol patterns of (2M+1) symbol length (where M is a given natural number and one symbol corresponds to an L chip) in which a correlation value matrix has an inverse matrix and is used for channel response estimation;

a shift register for receiving said correlator-output signal and said latch signal, holding said correlator-output signal of W chip length (where W is a natural number and is expressed as W≧(L+x), where x is 0 or natural number, and x≦L×(M−1)) when said latch signal is input, and outputting a correlator-output hold signal;

an estimation range selection circuit for receiving said correlator-output hold signal and selecting a channel response range of an estimated (L+x) chip length and outputting an estimation range selection signal corresponding to said selection range;

a memory for receiving said inverse matrix selection signal and outputting an inverse matrix signal corresponding to an inverse matrix of a corresponding correlation value matrix; and a correlator-output correction circuit for receiving said correlator-output hold signal and said estimation range selection signal and obtaining a channel response of a (L+x) chip length by multiplying said inverse matrix signal by said correlator-output hold signal over a range selected by said estimation range selection signal, and thus outputting an estimation channel signal.

5. The channel response estimation circuit defined in claim 4, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−K) and time (i−K+L+x−1) (where K is 0 or natural number and K≦i).

6. The channel response estimation circuit defined in claim 4, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−j) and time (i−j+L+x−1), j corresponding to a value where the total power of N-chip length (N≦L−1) between time (i−j) and time (i−j+N−1) (where i is 0 to P (natural number)) is maximized.

7. A channel response estimation circuit, comprising:

a correlator for performing a convolutional operation of a received signal and a correlation code sequence to output a correlator-output signal, said received signal partially having a combination in which said correlation code sequence of an L chip length (where L is a given natural number) and another correlation code sequence obtained by inverting signs of said correlation code sequence are strung;

a symbol decision circuit for performing a symbol decision of said correlator-output signal to output a decision signal;

a pattern detection circuit for receiving said decision signal and then outputting a latch signal and a polarity selection signal in response to detection of one of two symbol patterns of (2M+1) symbol length (where M is a given natural number and one symbol corresponds to an L chip) in which a correlation value matrix has an inverse matrix and is used for channel response estimation, said two symbol patterns having a sign opposite to each other;

a shift register for receiving said correlator-output signal and said latch signal, holding said correlator-output signal of W chip length (where W is a natural number and is expressed as W≧(L+x), where x is 0 or natural number, and x≦L×(M−1)) when said latch signal is input, and outputting a correlator-output hold signal;

an estimation range selection circuit for receiving said correlator-output hold signal and selecting a channel response range of an estimated (L+x) chip length and outputting an estimation range selection signal corresponding to said selection range;

a memory for outputting an inverse matrix tentative signal corresponding to an inverse matrix of a correlation value matrix corresponding to a symbol pattern used for channel response estimation;

a polarity selection circuit for receiving said polarity selection signal and said inverse matrix tentative signal and outputting an inverse matrix signal, obtained by inverting the sign of said inverse matrix tentative signal or said inverse matrix tentative signal, in response to said polarity selection signal; and a correlator-output correction circuit for receiving said correlator-output hold signal and said estimation range selection signal and obtaining a channel response of a (L+x) chip length by multiplying said inverse matrix signal by said correlator-output hold signal over a range selected by said estimation range selection signal and outputting an estimation channel signal.

8. The channel response estimation circuit defined in claim 7, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−K) and time (i−K+L+x−1) (where K is 0 or natural number and K≦i).

9. The channel response estimation circuit defined in claim 7, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−j) and time (i−j+L+x−1), j corresponding to a value where the total power of N-chip length (N≦L−1) between time (i−j) and time (i−j+N−1) (where i is 0 to P (natural number)) is maximized.

10. A channel response estimation circuit, comprising:

a correlator for performing a convolutional operation of a received signal and a correlation code sequence to output a correlator-output signal, said received signal partially having a combination in which said correlation code sequence of an L chip length (where L is a given natural number) and another correlation code sequence obtained by inverting signs of said correlation code sequence are strung;

a symbol decision circuit for performing a symbol decision of said correlator-output signal to output a decision signal;

a pattern detection circuit for receiving said decision signal and then outputting a latch signal and a polarity selection signal in response to detection of one of two symbol patterns of (2M+1) symbol length (where M is a given natural number and one symbol corresponds to an L chip) in which a correlation value matrix has an inverse matrix and is used for channel response estimation, said two symbol patterns having a sign opposite to each other;

a shift register for receiving said correlator-output signal and said latch signal, holding said correlator-output signal of W chip length (where W is a natural number and is expressed as W≧(L+x), where x is 0 or natural number, and X≦L×(M−1)) when said latch signal is input, and outputting a correlator-output hold signal;

an estimation range selection circuit for receiving said correlator-output hold signal and selecting a channel response range of an estimated (L+x) chip length and outputting an estimation range selection signal corresponding to said selection range;

a memory for outputting an inverse matrix signal corresponding to an inverse matrix of a correlation value matrix corresponding to a symbol pattern used for channel response estimation;

a correlator-output correction circuit for receiving said correlator-output hold signal and said estimation range selection signal and obtaining a tentative channel response of a (L+x) chip length by multiplying said inverse matrix signal by said correlator-output hold signal over a range selected by said estimation range selection signal, and thus outputting an estimation channel tentative signal; and a polarity selection circuit for receiving said inverse matrix tentative signal and said polarity selection signal and outputting as an estimation channel signal a signal obtained by inverting the sign of said estimation channel tentative signal or estimation channel tentative in response to said polarity selection signal.

11. The channel response estimation circuit defined in claim 10, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−K) and time (i−K+L+x−1) (where K is 0 or natural number and K≦i).

12. The channel response estimation circuit defined in claim 10, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−j) and time (i−j+L+x−1), j corresponding to a value where the total power of N-chip length (N≦L−1) between time (i−j) and time (i−j+N−1) (where i is 0 to P (natural number)) is maximized.

13. A channel response estimation circuit, comprising:

a correlator for performing a convolutional operation of a received signal and a correlation code sequence to output a correlator-output signal, said received signal partially having a combination in which said correlation code sequence of an L chip length (where L is a given natural number) and another correlation code sequence obtained by inverting signs of said correlation code sequence are strung;

a symbol decision circuit for performing a symbol decision of said correlator-output signal to output a decision signal;

a pattern detection circuit for receiving said decision signal and then outputting a latch signal and a polarity selection signal and an corresponding to a symbol pattern when one of plural symbol patterns of (2M+1) symbol length (where M is a given natural number and one symbol corresponds to an L chip) is detected, in which a correlation value matrix has an inverse matrix and is used for channel response estimation;

a shift register for receiving said correlator-output signal and said latch signal, holding said correlator-output signal of W chip length (where W is a natural number and is expressed as W≧(L+x), where x is 0 or natural number, and x≦L ×(M−1)) when said latch signal is input, and outputting a correlator-output hold signal;

an estimation range selection circuit for receiving said correlator-output hold signal and selecting a channel response range of an estimated (L+x) chip length, and outputting an estimation range selection signal corresponding to said selection range;

a memory for receiving an inverse matrix selection signal and outputting an inverse matrix tentative signal corresponding to an inverse matrix of a corresponding correlation value matrix;

a polarity selection circuit for receiving said polarity selection signal and said inverse matrix tentative signal and outputting as an inverse matrix signal a signal obtained by inverting the sign of said inverse matrix tentative signal or said inverse matrix tentative signal, in response to said polarity selection signal; and a correlator-output correction circuit for receiving said correlator-output hold signal and said estimation range selection signal and obtaining a channel response of a (L+x) chip length by multiplying said inverse matrix signal by said correlator-output hold signal over a range selected by said estimation range selection signal, and outputting an estimation channel signal.

14. The channel response estimation circuit defined in claim 13, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−K) and time (i−K+L+x−1) (where K is 0 or natural number and K≦i).

15. The channel response estimation circuit defined in claim 13, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−j) and time (i−j+L+x−1), j corresponding to a value where the total power of N-chip length (N≦L−1) between time (i−j) and time (i−j+N−1) (where i is 0 to P (natural number)) is maximized.

16. A channel response estimation circuit, comprising:

a correlator for performing a convolutional operation of a received signal and a correlation code sequence to output a correlator-output signal, said received signal partially having a combination in which said correlation code sequence of an L chip length (where L is a given natural number) and another correlation code sequence obtained by inverting signs of said correlation code sequence are strung;

a symbol decision circuit for performing a symbol decision of said correlator-output signal to output a decision signal;

a pattern detection circuit for receiving said decision signal and then outputting a latch signal and a polarity selection signal corresponding to a symbol pattern, in response to one of plural symbol patterns of (2M+1) symbol length (where M is a given natural number and one symbol corresponds to an L chip), in which a correlation value matrix has an inverse matrix and is used for channel response estimation;

a shift register for receiving said correlator-output signal and said latch signal, holding said correlator-output signal of W chip length (where W is a natural number and is expressed as W≧(L+x), where x is 0 or natural number, and X≦L×(M−1)) when said latch signal is input, and outputting a correlator-output hold signal;

an estimation range selection circuit for receiving said correlator-output hold signal and selecting a channel response range of an estimated (L+x) chip length, and outputting an estimation range selection signal corresponding to said selection range;

a memory for receiving an inverse matrix selection signal and outputting an inverse matrix signal corresponding to an inverse matrix tentative of a corresponding correlation value matrix;

a correlator-output correction circuit for receiving said correlator-output hold signal and said estimation range selection signal and obtaining a tentative channel response of a (L+x) chip length by multiplying said inverse matrix signal by said correlator-output hold signal over a range selected by said estimation range selection signal, and outputting an estimation channel tentative signal; and a polarity selection circuit for receiving said inverse matrix tentative signal and said polarity selection signal and outputting as an estimation channel signal a signal obtained by inverting the sign of said estimation channel tentative signal or said estimation channel tentative signal, in response to said selection signal.

17. The channel response estimation circuit defined in claim 16, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−K) and time (i−K+L+x−1) (where K is 0 or natural number and K≦i).

18. The channel response estimation circuit defined in claim 16, wherein said estimation range selection circuit comprises means for detecting time i, where i is the time where the power of the (M+1)-th symbol in a symbol pattern of (2M+1) symbol length has a peak value, and outputting said estimation range selection signal which selects said correlator-output hold signal of a length of (L+x) between time (i−j) and time (i−j+L+x−1), corresponding to a value where the total power of N-chip length (N≦L−1) between time (i−j) and time (i−j+N−1) (where i is 0 to P (natural number)) is maximized.

* * * * *